(12) United States Patent
Takimasa et al.

(10) Patent No.: US 8,805,643 B2
(45) Date of Patent: Aug. 12, 2014

(54) DISPLACEMENT SENSOR

(75) Inventors: Hiroaki Takimasa, Ayabe (JP); Yusuke Iida, Ayabe (JP); Hideyoshi Nakamura, Ayabe (JP); Hoshibumi Ichiyanagi, Fukuchiyama (JP)

(73) Assignee: Omron Corporation, Kyoto (JP)

( * ) Notice: Subject to any disclaimer, the term of this patent is extended or adjusted under 35 U.S.C. 154(b) by 232 days.

(21) Appl. No.: 13/495,478

(22) Filed: Jun. 13, 2012

(65) Prior Publication Data

US 2012/0303317 A1  Nov. 29, 2012

Related U.S. Application Data

(63) Continuation of application No. PCT/JP2011/056431, filed on Mar. 17, 2011.

(30) Foreign Application Priority Data

Jul. 30, 2010  (JP) ................................. 2010-172862

(51) Int. Cl.
   *G01B 11/02*  (2006.01)

(52) U.S. Cl.
   CPC .................................... *G01B 11/026* (2013.01)
   USPC ........................................................ 702/150

(58) Field of Classification Search
   CPC .................................................... G01B 11/026
   USPC ........................................................ 702/150
   See application file for complete search history.

(56) References Cited

U.S. PATENT DOCUMENTS

| | | | |
|---|---|---|---|
| 4,855,585 A | 8/1989 | Nonaka | |
| 6,188,842 B1 | 2/2001 | Yoshida | |
| 6,891,625 B2 | 5/2005 | Tomita et al. | |
| 6,995,385 B2 | 2/2006 | Tomita et al. | |
| 2006/0224354 A1* | 10/2006 | Iida et al. | 702/155 |

FOREIGN PATENT DOCUMENTS

| | | |
|---|---|---|
| JP | 9-126755 | 5/1997 |
| JP | 2000-180711 | 6/2000 |
| JP | 2002-296008 | 10/2002 |
| JP | 3409117 | 5/2003 |
| JP | 2007-155356 | 6/2007 |
| JP | 2008-058195 | 3/2008 |

OTHER PUBLICATIONS

International Search Report for corresponding International Application No. PCT/JP2011/056431, along with an English language version, dated May 24, 2011.

* cited by examiner

*Primary Examiner* — Bryan Bui
(74) *Attorney, Agent, or Firm* — Greenblum & Bernstein, P.L.C.

(57) ABSTRACT

Teaching processing using a model of a workpiece is performed by accepting at least one input of a target value for a response time and a tolerance value for a detection error as a parameter representing a condition for a displacement sensor to operate. A CPU during teaching processing determines a maximum exposure time while it causes repeated detection processing by a light projecting unit and a light receiving unit, calculates variation in measurement data of an amount of displacement, and derives the number of pieces of data of moving average calculation suitable for a value for the input parameter as a result of operation processing using the maximum exposure time and variation in measurement data. This number of pieces of data is registered in a memory and used for moving average calculation in a normal operation mode.

11 Claims, 6 Drawing Sheets

DISPLACEMENT SENSOR

CROSS-REFERENCE TO RELATED APPLICATIONS

This is a continuation application of PCT/JP2011/056431 filed Mar. 17, 2011, designating the United States of America, the disclosure of which, including the specification, drawings, and claims, is incorporated by reference in its entirety. The disclosure of Japanese Patent Application No. 2010-172862 filed Jul. 30, 2010, including the specification, drawings, and claims is expressly incorporated herein by reference in its entirety.

FIELD OF DISCLOSURE

The present disclosure relates to a displacement sensor for detecting an amount of displacement of an object through optical detection processing.

BACKGROUND INFORMATION

A displacement sensor based on principles of triangulation includes a light projecting unit including a light emitting element such as a laser diode and a light receiving unit including such a light receiving element as a PSD, a CCD, and a CMOS, and measures an amount of displacement based on a position in the light receiving unit where reflected light is incident while repeatedly performing processing for emitting light to an object to be detected from the light projecting unit and receiving at the light receiving unit, reflected light from the object to be detected (hereinafter referred to as "detection processing") and measurement processing for measuring an amount of displacement based on a result of reception of reflected light in a light receiving element.

Additionally, examples of a displacement sensor include a sensor to which a TOF (Time of Flight) method using a length of time from light projection to light reception is applied, a sensor to which a phase difference rangefinding method making use of a phase difference between projected light and received reflected light is applied, a sensor to which a PN code rangefinding method of projecting light of which intensity has been modulated with a PN code so as to conduct measurement using a result of correlation operation between that light and reflected light is applied, and the like.

Among these conventional displacement sensors, in order to stabilize detection, some sensors perform moving average calculation every time measurement data is obtained, by using that data and measurement data for a prescribed number of times in the past, and output an average value obtained in this calculation as detection data (see, for example, PTL 1).

In addition, PTL 1 discloses a displacement sensor having a function to set the number of pieces of data of moving average calculation above to a value suitable for obtaining accuracy demanded by a user through teaching processing by using a model of an object before main processing (see claim 6, paragraphs 0052 to 0057, and FIG. 6 of PTL 1).

Moreover, in order to conduct stable measurement with a displacement sensor, a time period for detection processing should be adjusted. For example, in a displacement sensor of a triangulation type, in order to clarify a peak of a light receiving amount signal generated by a light receiving unit, a light receiving amount signal having sufficient intensity should be obtained, however, intensity of a light receiving amount signal varies depending on a reflectance of a workpiece to be detected. Therefore, in the conventional displacement sensor, light emission intensity of a light emitting element or amplification gain of a light receiving amount signal is adjusted, and in addition, a time period for light projection processing or a time period required for both of light projection and light reception is adjusted in accordance with intensity of a light receiving amount signal (see, for example, paragraph 0021 of PTL 2).

PATENT LITERATURE

PTL 1: Japanese Patent No. 3409117
PTL 2: Japanese Patent Laying-Open No. 2008-58195

Problems Solved by the Disclosure

Herein, in a displacement sensor providing step response, a time period from the time when detection processing is performed until output (including also display) reflecting an amount of displacement detected in that detection processing ends will be referred to as a "response time". In a case where moving average calculation of measurement data is performed, a time period from the time when detection processing is performed until output of a result of final calculation in a plurality of times of moving average calculation using an amount of displacement detected in that detection processing corresponds to a response time.

Since a displacement sensor on which a high-speed CPU is mounted can perform measurement processing or moving average calculation in an extremely short period of time, a time period obtained by multiplying a processing time period necessary for detection processing once by the number of pieces of data to be subjected to moving average calculation can be considered as a time period substantially comparable to a response time.

In a case where a time period during which detection can be carried out is restricted, such as a case where a moving substance is to be detected, a length of a response time should be adjusted in accordance with the restricted time period. Though the number of pieces of data of moving average calculation should be decreased in order to shorten a response time, decrease in the number of pieces of data of moving average calculation may lead to poorer accuracy in detection data (error in detection data becomes great).

Namely, in adjustment of the number of pieces of data of moving average calculation, a response time and accuracy of detection data have trade-off relation.

A response time varies owing not only to the number of pieces of data of moving average calculation but also to a length of a processing time period for detection processing. Namely, in a case where the number of pieces of data of moving average calculation is fixed, a response time becomes longer as a processing time period is longer. In contrast, as the processing time period is shorter, the response time is also accordingly shorter.

On the other hand, accuracy of detection data is affected by an extent of variation in measurement data. Variation in measurement data fluctuates owing not only to capability of a sensor but also to a degree of ambient optical noise, a degree of asperity of an object to be detected, or the like.

At a site where a displacement sensor is used, the number of pieces of data of moving average calculation should be set in accordance with a production goal, a purpose of use of a displacement sensor, or the like at that site. For example, in a case where a displacement sensor is used for detecting difference in height in an article carried on a belt conveyor, it is necessary to set a target value for a response time such that an appropriate number of pieces of detection data is obtained while articles pass by a position where detection by a sensor is carried out and to find the number of pieces of data of moving average calculation such that the target value is achieved. In addition, it is also necessary to check whether or not a result of moving average calculation with that number of pieces of data satisfies accuracy required at the site.

A user, in particular a novice, at the site, however, is less likely to understand the concept of operation processing of moving average calculation or relation of influence by the number of pieces of data of moving average calculation on a response time or accuracy of detection data, and it may be difficult to make setting. In addition, since a processing time period or variation in measurement data suitable for detection processing fluctuates depending on a state of an object to be detected or a surrounding environment, it is also difficult to make such general setting as conforming to any instance. Therefore, most users at the site perform a setting operation through a trial and error process and hence users expend enormous efforts.

In connection with the problem above, in teaching processing described in PTL 1, user's designation of accuracy necessary for measurement processing is accepted, the number of pieces of data is variously changed to perform moving average calculation while detection processing and measurement processing for a model of an object are repeated, and the number of pieces of data as enabling variation in this result of calculation to adapt to designated accuracy is found. Burden imposed on the user can thus be mitigated. In this teaching processing described in PTL 1, however, the number of pieces of data of moving average calculation is determined only aiming to ensure detection accuracy without considering a length of a response time, and therefore this teaching processing is inadequate.

With attention being paid to the problems above, it is an object of the present disclosure to be able to automatically find through calculation and register a value of the number of pieces of data of moving average calculation necessary for ensuring a response time or accuracy of detection data at which a user aims, based on a result of detection processing or measurement processing on an actual model of an object to be detected.

SUMMARY OF THE DISCLOSURE

A displacement sensor according to the present disclosure outputs detection data based on an average value obtained by moving average calculation while repeatedly executing a detection process of projecting light to an object and receiving the light reflected from the object, a measurement process of measuring an amount of displacement of the object based on the result of reception of the reflected light, and a moving average calculation of data of the measurement, and includes registering means (a register) for registering the number of pieces of data of the moving average calculation, input means (an input) for inputting a parameter representing conditions related to response time and a parameter representing conditions related to accuracy of the detection data, and teaching mode executing means (a teaching mode processor) for executing a teaching mode in which the number of pieces of data of the moving average calculation is registered with the registering means. In addition, the teaching mode executing means includes setting processing means (a setting processor), data number derivation means (a data number deriving processor), and registration processing means (a registration processor) below.

The setting processing means executes the detection process and the measurement process, each for a plurality of times, and executes a process for setting processing time of the detection process and a process of calculating variation of measurement data obtained by the measurement process.

The data number derivation means derives, on condition that at least one of the parameter representing conditions related to response time and the parameter representing conditions related to accuracy of the detection data is input to the input means and the processes are executed by the setting processing means, the number of pieces of data of moving average calculation suitable for the value of the input parameter, by an operation using results of processing by the setting processing means.

The registration processing means determines the number of pieces of data of the moving average calculation based on the result of processing by the data number derivation means and registers it (the number) with the registering means. According to the displacement sensor configured as above, as a teaching mode is started in such a manner that a model of an object to be detected is brought in correspondence with a position where it is irradiated with light from the sensor, the setting processing means performs each of detection processing and measurement processing a plurality of times, a processing time period for detection processing is set to an appropriate length, and variation in measurement data is derived. In addition, as at least one of a parameter representing a condition related to a response time and a parameter representing a condition related to accuracy of detection data is input, operation processing using that parameter value and a result of processing by the setting processing means is performed, the number of pieces of data of moving average calculation is derived, and this number of pieces of data can be registered with the registering means.

Therefore, as a user determines a condition related to a response time or accuracy of detection data in accordance with a purpose of use of a displacement sensor, a production goal at the site or the like, inputs parameters representing these conditions to a sensor, and executes the teaching mode, the number of pieces of data of moving average calculation suitable for satisfying the conditions above can automatically be derived by the sensor and registered.

In one preferred embodiment of the displacement sensor above, the input means inputs a numerical value representing a target value of the response time as the parameter representing conditions related to response time, and inputs a numerical value representing an error tolerance value of detection data as the parameter related to accuracy of the detection data.

In addition, the data number derivation means in this embodiment executes an operation using at least one of a first operational expression representing a relation (relationship) among (between) processing time of the detection process, the number of pieces of data of the moving average calculation and the response time, and a second operational expression representing a relation (relationship) among (between) the variation of measurement data, the number of pieces of data of the moving average calculation and the error of detection data, as the operation. For example, when a target value for a response time is input, the input value and the processing time period for detection processing adjusted by the setting processing means are substituted in the first operational expression, to thereby calculate the number of pieces of data of moving average calculation. Meanwhile, when an error tolerance value for detection data is input, the input value and variation in measurement data found by the setting processing means are substituted in the second operational expression, to thereby calculate the number of pieces of data of moving average calculation.

In a more preferred embodiment, when both the parameters representing the target value of the response time and the error tolerance value of detection data are input to the input means, the data number derivation means selects either one of the parameters with (according to) priority, executes a first operation of calculating the number of pieces of data of moving average calculation by applying the value input for the parameter and the result of processing by the setting processing means to the operational expression corresponding to the selected parameter, and thereafter executes a second operation by applying the number of pieces of data of moving average calculated by the first operation and the result of processing by the setting processing means to the operational expression corresponding to the non-selected (unselected) parameter, to calculate the value of the parameter. The registration processing means determines whether or not the value of the non-selected parameter calculated by the second operation matches the value input to the input means, and when it is determined to be matching, registers the number of pieces of data of moving average calculated by the first operation with the registering means.

According to the embodiment above, in a case where the user inputs each parameter of a target value for a response time and an error tolerance value for detection data, the number of pieces of data of moving average calculation as adapting to the conditions represented by both of these parameters can be set and the number of pieces of data optimal for the condition represented by the parameter on which priority is placed can be set.

A parameter on which priority is to be placed here is desirably selected through a user's selection operation, however, for example, an operation of the data number derivation means may be defined such that priority is placed on a condition related to a response time. Alternatively, in a case where a parameter is selected in response to a user's selection operation, means for accepting that operation does not necessarily have to be provided in a sensor main body. For example, a device outside the sensor may accept a selection operation and a signal indicating a selection result may be input to the sensor.

The displacement sensor in yet another embodiment is provided with output means for outputting (an output), when it is determined by the registration processing means that the value of the non-selected parameter calculated by the second operation does not match the value input to the input means, the value of the parameter calculated by the second operation for display. This output can be provided to a display unit provided in the sensor or an external device having a display unit.

According to the embodiment above, in a case where the number of pieces of data of moving average calculation is set based on a preferentially selected parameter and such setting results in failure in satisfying a condition designated by the user in connection with a parameter not selected, the user can be notified of magnitude of a value of the parameter not selected. Therefore, the user can take such measures as executing again the teaching mode, by correcting a parameter based on a value of which he/she has been notified to thereby fix the number of pieces of data of moving average calculation, or by referring to a value of which he/she has been notified to thereby change a value of each parameter.

Further, the displacement sensor in another preferred embodiment of the present disclosure is provided with signal input means (a signal input) for inputting a signal instructing start of processing in the teaching mode, and the setting processing means operates in response to an input of the signal. By doing so, as a signal is input to the signal input means while a model of an object to be detected is irradiated with light projected from the displacement sensor, that is, when detection processing is ready, data reflecting a result of processing on the object to be detected with regard to a processing time period for detection processing or variation in measurement data can be obtained.

In the displacement sensor in a more preferred embodiment, the data derivation means and the registration processing means operate together with the setting processing means, every time the signal instructing start of processing is input. Further, in response to the input of the signal for the second time and onwards, the registration processing means determines an optimal value of the number of pieces of data of moving average, using the number of pieces of data derived from processing by the setting processing means and the data number derivation means in response to the input, and the number of pieces of data registered with the registering means in response to the signal input last time (the previous time).

According to the embodiment above, in a case where a plurality of types of objects are to be detected or a plurality of parts different in reflectance are included in an object to be detected, every time a model of each object or each part in one model is successively brought in correspondence with a position where it is irradiated with light from the sensor, a signal supporting start of processing is input, so that the number of pieces of data of moving average calculation can be obtained for each model or each part. The registration processing means can set the number of pieces of data of moving average to an appropriate value in a range satisfying conditions for a response time or accuracy of detection data, by using every number of pieces of data.

As another embodiment in a case where processing of a plurality of types of objects or a plurality of parts different in reflectance is assumed, second signal input means (a second signal input) for inputting a signal instructing end of processing in the teaching mode may be provided. In this embodiment, the setting processing means and the data number derivation means operate every time (when) the signal instructing start of processing is input, and the registration processing means operates in responses to an input of the signal instructing end of processing. In addition, when the signal instructing start of processing is input a plurality of times before the signal instructing end of processing is input, the registration processing means determines an optimal value of the number of pieces of data of moving average, using the number of pieces of data of each moving average derived by the data number derivation means in response to every input of the signal.

In another embodiment in a case where second signal input means is provided, the setting processing means and the data number derivation means operate in response to an input of the signal instructing start of processing, and the registration processing means operates in responses to an input of the signal instructing end of processing. Further, the setting processing means and the data number derivation means are capable of executing processes a plurality of times from the input of the signal instructing start of processing until the input of the signal instructing end of processing. In addition, when a plurality of numbers of data of moving average are derived by the data number derivation means before the signal instructing end of processing is input, the registration processing means determines an optimal value of the number of pieces of data of moving average, using these numbers of data.

In the displacement sensor in the two embodiments above, an operation unit (a signal generator) for generating the signal instructing start of processing and the signal instructing end of processing can be provided. In this case, the user can perform an operation to indicate start of processing while he/she confirms that the object to be detected or the part to be detected has been brought in correspondence with the position where it is irradiated with light from the sensor, and can perform an operation to indicate end in response to the fact that processing on all models or all parts has ended, so that an appropriate value for the number of pieces of data of moving average calculation can be determined and registered.

It is noted that a signal input to the signal input means is not limited to a signal generated by the operation unit above and a signal can also be input from an external device (a personal computer, a PLC, other sensors, etc.). For example, in a case where the teaching mode is executed while an object to be detected is being moved, the fact that a model of the object to be detected has entered an area of detection by the displacement sensor may be detected by another sensor or the like, that detection signal may be input as a signal indicating start of processing, and the setting processing means may be operated in response to that input.

A displacement sensor based on another point of view of the present disclosure, on the premise that it outputs detection data based on an average value obtained by moving average calculation while repeatedly executing a detection process of projecting light to an object and receiving the light reflected from the object, a measurement process of measuring an amount of displacement of the object based on the result of reception of the reflected light, and a moving average calculation of data of the measurement, includes registering means (a register) for registering the number of pieces of data of the moving average calculation, and teaching mode executing means (a teaching mode processor) for executing a teaching mode in which the number of pieces of data of the moving average calculation is registered with the registering means.

The teaching mode executing means includes setting processing means (a setting processor), specifying means (a specifying processor), and registration processing means (a registration processor).

The setting processing means executes the detection process and the measurement process, each for a plurality of times, and executes a process for setting processing time of the detection process and a process of calculating variation of measurement data obtained by the measurement process.

The specifying means specifies a first function representing a relation between response time of the displacement sensor and the number of pieces of data of moving average calculation, based on processing time of the detection process set by the setting processing means, and specifies a second function representing a relation between an error of detection data and the number of pieces of data of the moving average calculation based on the variation of measurement data calculated by the setting processing means. In addition, the specifying means specifies, based on these functions, at least one combination of the number of pieces of data of moving average, the response time corresponding to the number of pieces of data, and the error of detection data corresponding to the number of pieces of data.

The registration processing means displays the combination of response time and accuracy of detection data specified by the specifying means to be ready for a selection operation, and when any displayed combination is selected, registers the number of pieces of data of moving average corresponding to the selected combination with the registering means.

According to the displacement sensor configured as above, by executing the teaching mode with a model of an object being installed such that it is irradiated with light from the sensor, a processing time period for detection processing is set and variation in measurement data is found. In addition, using two functions specified based thereon, at least one combination of the number of pieces of data of moving average calculation with a response time and an error in detection data realized by that number of pieces of data is specified, and a response time and an error in detection data in each set are displayed. As the user selects combination that seems to be preferred in this display, the number of pieces of data of moving average calculation corresponding to the selected combination is registered with the registering means.

Effects of the Disclosure

According to the present disclosure, based on a result of detection processing or measurement processing on an actual model of an object to be detected, the number of pieces of data of moving average calculation can automatically be set to a value necessary for a response time or accuracy in detection data to satisfy a condition required by the user. Therefore, setting processing necessary for use of a displacement sensor can readily be performed without burden being imposed on the user.

DETAILED DESCRIPTION

Figure 1:
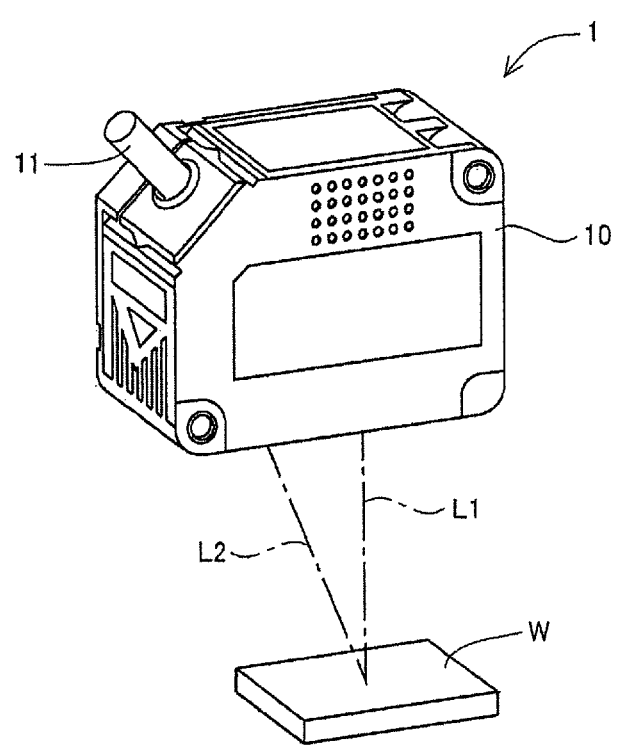
FIG. 1 is a perspective view showing appearance of a sensor head of a displacement sensor.
Figure 2:
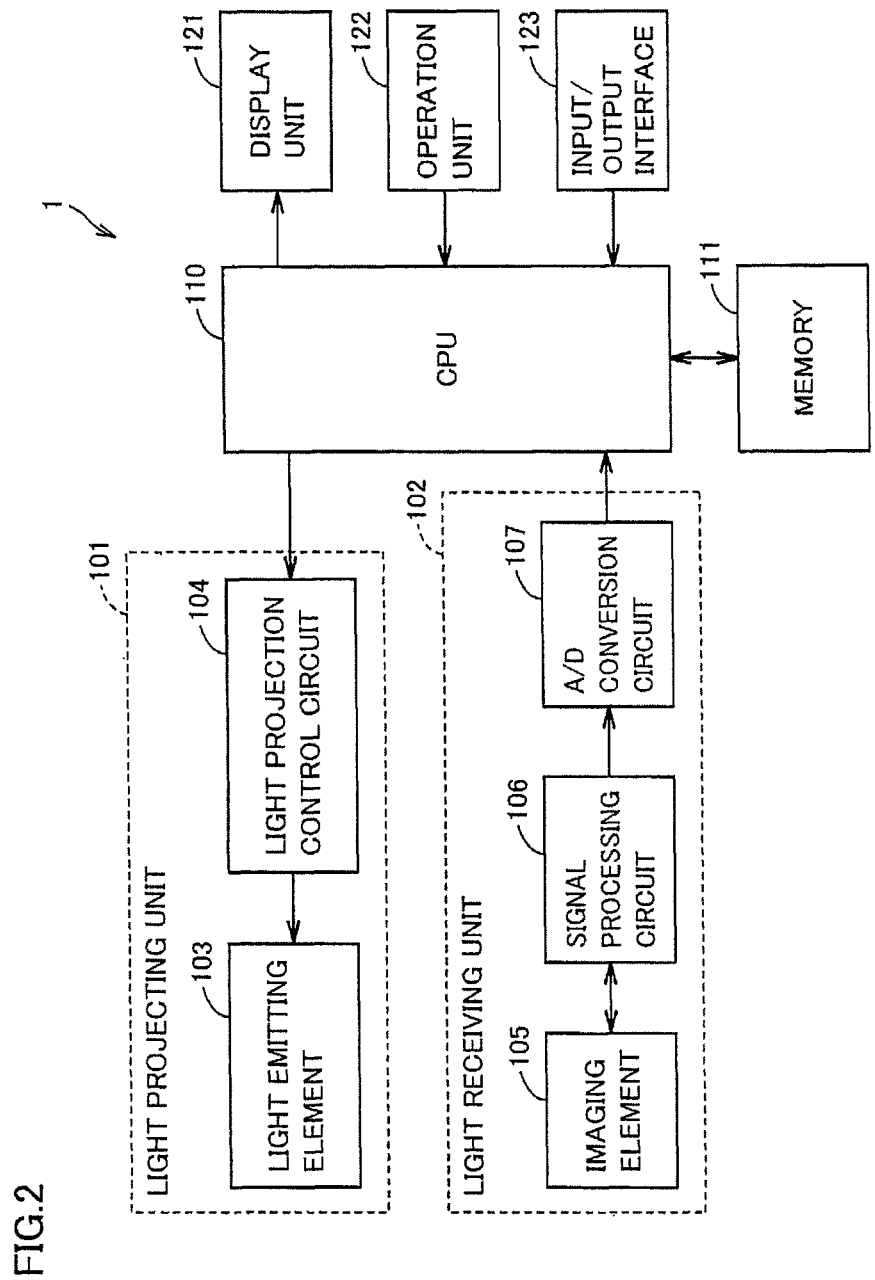
FIG. 2 is a block diagram showing an electrical configuration of the displacement sensor.

FIG. 1 shows appearance of a sensor head according to one embodiment of a displacement sensor to which the present disclosure is applied, and FIG. 2 shows an electrical configuration of the displacement sensor.

A displacement sensor 1 in this embodiment projects a laser beam L1 from a sensor head 10 onto a workpiece W to be detected, receives reflected light L2 of this laser beam L1 from workpiece W, and measures an amount of displacement of a surface of workpiece W based on principles of triangulation. It is noted that it is a distance from sensor head 10 that is measured as an amount of displacement, and a numerical value representing a distance can be output also as detection data. In addition, by registering in advance a distance to a reference plane such as a support plane of workpiece W, a measured distance can be replaced with a height when viewed from the reference plane, so that this height can also be output as detection data.

A light projecting unit 101, a light receiving unit 102, a CPU 110, a memory 111, and the like shown in FIG. 2 are incorporated in sensor head 10. In addition, though not shown, an auxiliary housing called an amplification portion is connected through a cable 11 to sensor head 10, and this amplification portion is provided with a display unit 121, an operation unit 122, an input/output interface 123, and the like shown in FIG. 2. It is noted that sensor head 10 and the amplification portion do not necessarily have to be separate from each other and all features shown in FIG. 2 may be provided in a single housing.

Light projecting unit 101 is provided not only with a laser diode (LD) as a light emitting element 103 but also with a light projection control circuit 104. Light projection control circuit 104 drives light emitting element 103 while adjusting light emission intensity or a light emission time period of light emitting element 103 based on a command from CPU 110.

Light receiving unit 102 is provided with a CMOS as an imaging element 105 and also with a signal processing circuit 106 for processing an image signal generated by this imaging element 105 and an A/D conversion circuit 107. Signal processing circuit 106 controls timing of an operation of imaging element 105 based on a command from CPU 110, and takes in an image generated by imaging element 105 for output to A/D conversion circuit 107. An image resulting from digital conversion by A/D conversion circuit 107 is input to CPU 110 for measurement processing.

Memory 111 is a non-volatile memory such as an EEPROM, and it stores not only a program but also setting data for defining each operation of CPU 110, the number of pieces of data of moving average calculation derived in a teaching mode which will be described later, a maximum exposure time, and the like. In addition, in this memory 111, a function as a buffer for storing every measurement data for moving average calculation is also set.

CPU 110 causes light projecting unit 101 to emit laser beam L1 based on a program or setting data in memory 111 and causes light receiving unit 102 to operate in accordance with the timing of emission to thereby receive reflected light L2 from workpiece W. Thus, an image showing a state of reflected light L2 incident on imaging element 105 is generated.

Light projection processing and light reception processing above are hereinafter collectively referred to as "detection processing".

CPU 110 causes light projecting unit 101 and light receiving unit 102 to repeatedly perform detection processing, processes an image generated in every detection processing, and detects a reflected-light image in this image. Further, CPU 110 detects a coordinate of a position in the reflected-light image where a maximum light receiving amount is obtained (a peak of the light receiving amount), and measures an amount of displacement of workpiece W based on this coordinate.

In addition, in this embodiment, in order to stabilize output, moving average calculation of measurement data is performed, and an average value obtained in that calculation or a numerical value obtained by replacing this average value with a height when viewed from the reference plane described previously is displayed on display unit 121 as detection data.

Display unit 121 displays the detection data above, and also displays a numerical value input by the user, a provisionally set numerical value, and the like in the teaching mode which will be described later. Operation unit 122 is set to accept an operation to switch to the teaching mode and an operation to indicate start of teaching and also to accept an input of a parameter serving as a condition in teaching.

Input/output interface 123 is connected to an external device such as a personal computer or a PLC. When an external device is connected, a setting operation or an input operation similar to those performed through operation unit 122 above are performed in the external device and contents in the operation can be transmitted to CPU 110 in displacement sensor 1. In addition, a result of setting in the teaching mode and detection data obtained in a normal operation mode can also be output to the external device through input/output interface 123 and displayed thereon.

Further, in displacement sensor 1 in this embodiment, a function to adjust an exposure time based on intensity of every light receiving amount is set such that measurement processing on workpiece W can be performed in a stable manner. This adjustment processing is performed through cooperation among CPU 110, light projection control circuit 104, and signal processing circuit 106.

Here, an exposure time refers to a length of a period including a period during which light projecting unit 101 emits laser beam L1 and a period during which light receiving unit 102 receives reflected light L2. Though operation periods of light projecting unit 101 and light receiving unit 102 are made equal to each other in this embodiment, the embodiment is not limited as such. There is also a case of control where an operation period of light projecting unit 101 is set slightly longer than an operation period of light receiving unit 102 so that light reception processing by light receiving unit 110 is started after light projection from light projecting unit 110 is started and light projection processing ends after light reception processing ends. In addition, though rarely adopted, there is also a case where an operation period of light receiving unit 102 is longer than an operation period of light projecting unit 101.

The exposure time above is adjusted such that it is longer as a reflectance of workpiece W to be detected is lower. As the exposure time is longer, a cycle of obtaining every measurement data also becomes longer, which affects a length of a response time.

In addition, in image data generated by light receiving unit 102, fluctuation originating from capability of the sensor, ambient optical noise around the sensor, asperity or vibration of workpiece W (vibration being caused while workpiece W moves), or the like occurs. Such fluctuation leads to variation in measurement data, which in turn affects accuracy of detection data.

Further, since a result of moving average calculation is output as detection data in this embodiment, a response time varies also depending on the number of pieces of data of moving average calculation. Furthermore, detection accuracy also varies depending on the number of pieces of data of this moving average calculation.

Specifically, relation between a response time or detection accuracy and the number of pieces of data of moving average calculation is shown as an expression, as seen in Expression A and Expression B below.

$$\text{Response Time}(RT) = \text{Maximum Exposure Time } (ST) \times \text{The Number of Pieces of Data of Moving Average Calculation } (N) \quad \langle \text{Expression A} \rangle$$

$$\text{Detection Error } (D) = \frac{(1)}{\sqrt{\text{The Number of Pieces of Data of Moving Average Calculation } (N)}} \times \text{Variation in Measurement Data } (V) \quad \langle \text{Expression B} \rangle$$

"Maximum exposure time (ST)" in Expression A represents a maximum value of the exposure time set in processing for adjusting the exposure time. "Variation in measurement data (V)" in Expression B can be found, for example, as a difference between a maximum value and a minimum value in measurement data obtained in detection processing and associated measurement processing of a plurality of times. Alternatively, variance or standard deviation among measurement data can also be adopted as variation V. Alternatively, deviation between measurement data obtained in every measurement processing and immediately preceding measurement data may be obtained and a maximum value in deviations obtained in the past may be adopted as variation V (for example, an initial value for V is assumed as 0, and each time deviation greater than V is obtained, a value for V is overwritten with that deviation).

With the displacement sensor in this embodiment, as a result of a user's mode switching operation, the teaching mode for registering the number of pieces of data N of moving average calculation can be executed. In utilizing this teaching mode, the user inputs at least one of a value that seems to be preferred as a response time RT (a target value) and a value tolerable as a detection error D (a tolerance value), installs an actual model of workpiece W to be detected (hereinafter referred to as a "workpiece model") directly under sensor head 10, and performs an operation to start teaching by using operation unit 122 or an external device. Thus, detection processing or measurement processing on the workpiece model is performed, maximum exposure time ST is determined, and variation in measurement data V is calculated. In addition, based on Expression A and Expression B in which each value for ST and V is substituted, a numerical value necessary for satisfying a condition represented by a target value or a tolerance value input by the user is derived as the number of pieces of data N of moving average calculation. The derived number of pieces of data N is displayed on display unit 121 and registered in memory 111.

When registration processing above is completed and switching from the teaching mode to the normal operation mode is made, CPU 110 reads, every time, N pieces of measurement data in total retroactively from most recent measurement data while it performs detection processing and measurement processing, and calculates an average value thereof. Then, the calculated average value or a value obtained by replacing this average value with data of a height when viewed from the reference plane is output as detection data.

In the teaching mode in this embodiment, a target value RT0 for a response time can be input as a parameter representing a condition related to a response time, and a tolerance value D0 for detection error can be input as a parameter representing a condition related to detection accuracy. As shown in Expression A and Expression B, however, these conditions have trade-off relation. Therefore, in this embodiment, such a state that priority is placed on a condition related to response time RT is adopted as default setting, and in a case where a condition related to detection accuracy is also input, initially based on Expression A, a value necessary for setting response time RT to a value close to target value RT0 is calculated assuming the number of pieces of data of moving average calculation as N, and thereafter whether or not detection error D caused in moving average calculation with the number of pieces of data being N is equal to or smaller than tolerance value D0 input by the user is determined based on Expression B. Here, when detection error D is equal to or smaller than tolerance value D0, the number of pieces of data N is registered.

On the other hand, when detection error D with the number of pieces of data being N exceeds tolerance value D0 input by the user, the number of pieces of data N is not registered. When difference from tolerance value D0 is small (which is determined based on a threshold value 81 which will be described later), however, the number of pieces of data N can also be registered through a correction operation which will be described later.

Figure 3:
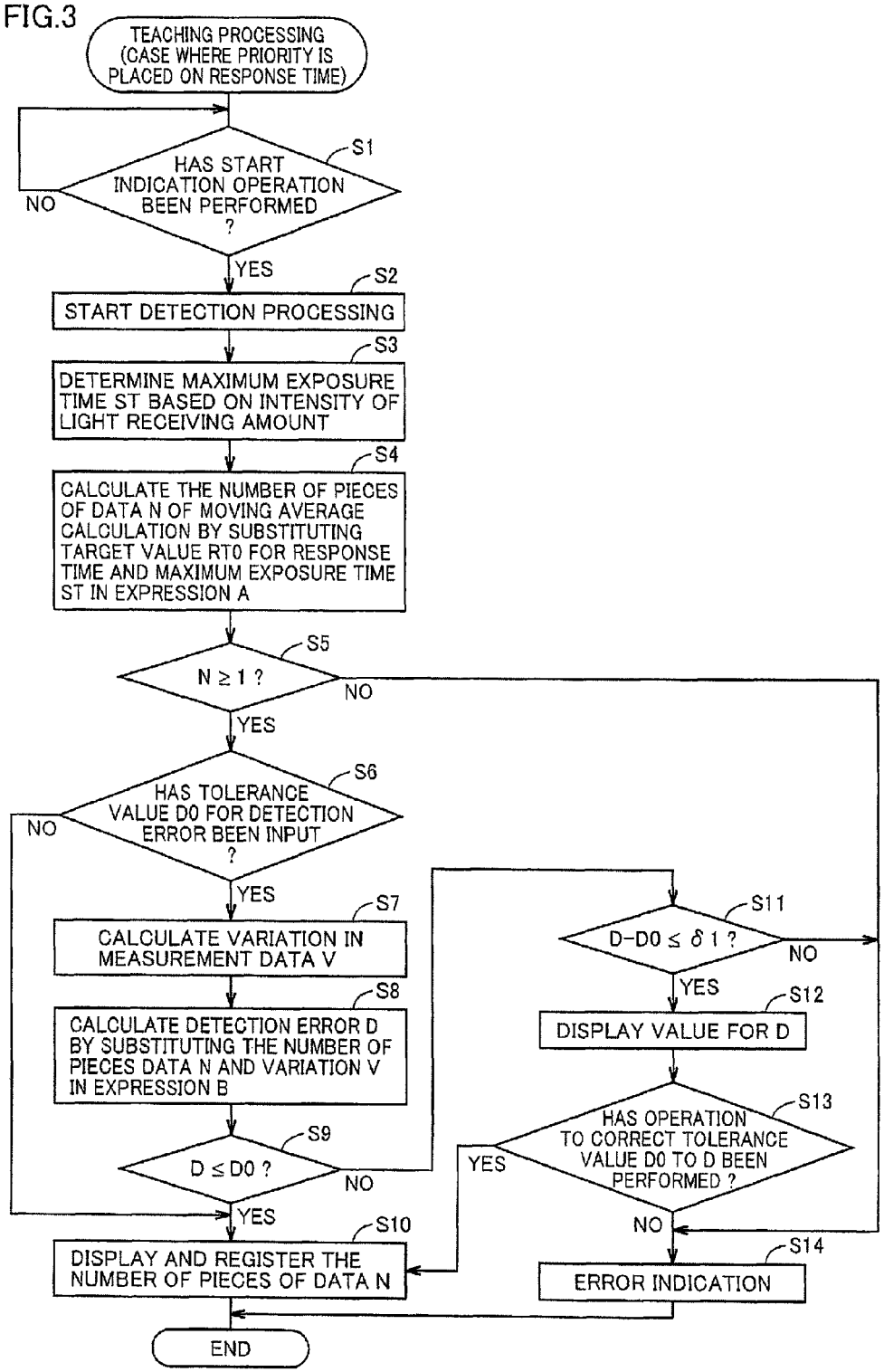
FIG. 3 is a flowchart showing a procedure of teaching processing in a case where priority is placed on a response time.

FIG. 3 shows a processing procedure in the teaching mode in accordance with the default setting above. This processing procedure is applied to a case where both of target value RT0 for a response time and tolerance value D0 for detection error are input under the default setting and also to a case where only target value RT0 for a response time is input.

In addition, this processing procedure is on the premise that a user installs a workpiece model such that laser beam L1 is appropriately emitted downward of sensor head 10 and thereafter an operation to indicate start of processing is performed. As this operation is performed, determination as "YES" is made in step S1 and detection processing by light projecting unit 101 and light receiving unit 102 is started (step S2).

Though not clearly shown in FIG. 3, detection processing is repeatedly performed also subsequently. In addition, each time detection processing is performed, an exposure time is adjusted based on intensity (a peak value of the light receiving amount or an integral value of the light receiving amounts in the entire reflected light image) of reflected light L2 shown in the image from light receiving unit 102 and that exposure time is applied to next detection processing. In this example, with a period until the exposure time is stabilized being defined as step S3, maximum exposure time ST is determined from every exposure time. Though the exposure time is adjusted continually also in subsequent detection processing, adjustment thereof is made in a range not exceeding maximum exposure time ST.

In step S4, value RT0 input as the target value for the response time and maximum exposure time ST determined in step S3 are substituted into Expression A and this Expression A is executed, to thereby calculate the number of pieces of data N of moving average calculation. It is noted that N is an integer and if digits to the right of a decimal point are included in a result of calculation, these values are dropped. In addition, in consideration of influence by a time period for measurement processing or moving average calculation, the number of pieces of data N may be corrected to a value slightly smaller than the calculated value.

When the calculated value for N is equal to or greater than 1 ("YES" in step S5), whether tolerance value D0 for the detection error has been input or not is checked. When D0 has not been input ("NO" in step S6), the number of pieces of data N calculated in calculation above is displayed on display unit 121 and registered in memory 111, and the process ends here.

On the other hand, when tolerance value D0 for the detection error has been input ("YES" in step S6), the process proceeds to step S7, in which detection processing and measurement processing are performed a plurality of times and variation in measurement data V obtained in the processing is calculated. Though measurement processing is performed at the time point of processing in step S7 so as to find variation in measurement data V in this example, the processing is not limited as such. Measurement processing may also be started when detection processing is started in step S2 and variation in measurement data V may be found in parallel to processing for adjusting an exposure time. It is noted that variation V in this case will be a slightly rough value.

Then, in step S8, variation in measurement data V and the number of pieces of data N found in step S4 are substituted in Expression B to thereby calculate detection error D, and this detection error D is compared with tolerance value D0 input by the user (step S9). When D is equal to or smaller than D0 here ("YES" in step S9), the process proceeds to step S10, in which the number of pieces of data N is displayed and registered, and the process ends.

When calculated detection error D is greater than D0 ("NO" in step S9), a difference therebetween is compared with predetermined threshold value 81. When a value of difference is equal to or smaller than δ1, a value for detection error D is displayed on display unit 121 (step S11).

Here, when an operation to correct tolerance value D0 to D is performed with an assumption that the user will accept a value for detection error D ("YES" in step S13), the process proceeds to step S10. Thus, the number of pieces of data N calculated in step S4 is displayed and registered.

On the other hand, when an operation to cancel is performed with an assumption that the user will not accept a displayed value for tolerance value D ("NO" in step S13), the process proceeds to step S14, in which display on display unit 121 is switched to error indication, and the process ends.

It is noted that more detailed display may be provided in step S10 or step S14. For example, in step S10, together with the number of pieces of data N, each value of maximum exposure time ST, variation in measurement data V, and detection error D can be displayed. In step S14, in addition to a message indicating an error, the calculated number of pieces of data N can be displayed or display associating detection error D and tolerance value D0 with each other can be provided. In a case where such detailed display is provided, display on an external device may be adopted.

According to the processing above, since a value necessary for setting response time RT to a length close to target value RT0 input by the user can automatically be derived as the number of pieces of data N of moving average calculation, the derived number of pieces of data N can promptly be registered in a case where the user has not designated tolerance value D0 for detection error. In addition, even in a case where tolerance value D0 for detection accuracy is input, when detection accuracy D realized by the derived number of pieces of data N is equal to or smaller than tolerance value D0, the number of pieces of data N can promptly be registered.

Therefore, the user determines a condition in accordance with a production goal at the site, a purpose of use of the displacement sensor, or the like in connection with at least the response time of response time RT and detection error D and inputs a numerical value representing that condition, so that the number of pieces of data N most suitable for the condition determined by the user can automatically be derived and registered within the sensor's capability. Therefore, even a user who does not understand well the concept of moving average calculation or influence by the number of pieces of data N used in this calculation on a response time or detection accuracy can make setting optimal for operating the displacement sensor in order to satisfy the condition determined by the user himself/herself.

In addition, even in a case where the user cannot obtain desired detection accuracy with the derived number of pieces of data N, when detection error D that can be realized is not considerably distant from tolerance value D0 and the user can accept detection error D, the calculated number of pieces of data N can be registered by performing an operation to correct tolerance value D0 to D. Thus, convenience of the sensor can be enhanced.

Moreover, according to the processing in FIG. 3, when difference between calculated measurement error D and tolerance value D0 is greater than δ1 ("NO" in step S11) or when the number of pieces of data N calculated in step S4 is smaller than 1 (step S5), an error indication (step S14) is given. Therefore, when the number of pieces of data N cannot ensure accuracy desired by the user or when the user's desired condition cannot be fulfilled with the sensor's capability, registration of the number of pieces of data at an inappropriate value can be prevented.

Further, in the teaching processing above, maximum exposure time ST determined in step S3 is desirably registered together with the number of pieces of data N. This is because, by registering maximum exposure time ST, in adjusting an exposure time in the normal operation mode, an adjusted value can be controlled not to exceed maximum exposure time ST and an actual response time can reliably be not greater than target value R0.

It is noted that registration of maximum exposure time ST is not essential.

This is because, if an exposure time is well adjusted in the teaching processing and then maximum exposure time ST is determined, an exposure time in the normal operation mode will also be within a range below maximum exposure time ST.

Figure 4:
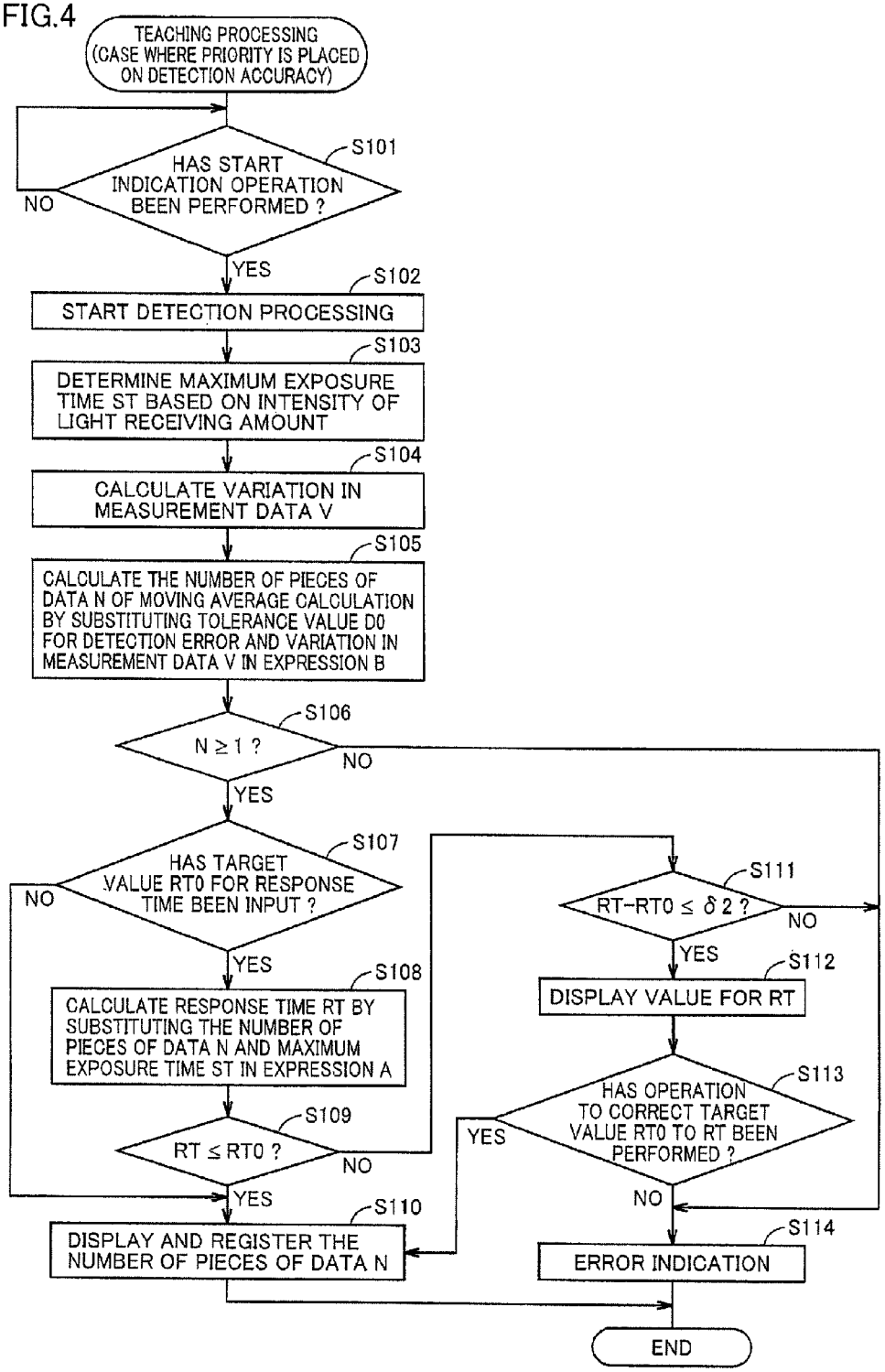
FIG. 4 is a flowchart showing a procedure of teaching processing in a case where priority is placed on detection accuracy.

Under the default setting above, priority is placed on the response time of response time RT and detection error D, however, the user can also change setting so as to place priority on detection error D. FIG. 4 shows a processing procedure in a case where this setting is changed.

In this processing, such a premise is made that the user inputs at least tolerance value D0 for detection error and installs a workpiece model at a position where it is irradiated with laser beam L1 and then a start indication operation is performed. When the start indication operation is performed ("YES" in step S101), detection processing is started as in steps S2 to S4 in FIG. 3 and maximum exposure time ST is determined (steps S102, S103). In addition, variation in measurement data V is calculated (step S104).

Then, tolerance value D0 for detection error and variation V calculated in step S104 are substituted into Expression B to thereby calculate the number of pieces of data N of moving average calculation (step S105). It is noted that, in a case where numerical values to the right of the decimal point are included in this result of calculation, such numerical values are rounded up. In addition, in order to reliably suppress a detection error to tolerance value D0 or smaller, a calculated value for the number of pieces of data N may be corrected to a value to which a small value has been added.

When the value for N calculated in the processing above is equal to or greater than 1 ("YES" in step S106), whether target value RT0 for a response time has been input or not is checked. When target value RT0 has not been input, the process proceeds to step S110, in which the number of pieces of data N is displayed on display unit 121 and registered in memory 111, and the process ends.

When target value RT0 has been input ("YES" in step S107), the number of pieces of data N calculated in calculation above and maximum exposure time ST determined in step S103 are substituted into Expression A to thereby calculate response time RT (step S108), and this value for RT is compared with target value RT0 input by the user (step S109). Here, when RT is equal to or smaller than RT0 ("YES" in step S109), the process proceeds to step S110, in which the number of pieces of data N is displayed and registered, and the process ends.

On the other hand, when calculated response time RT exceeds target value RT0 ("NO" in step S109), difference therebetween is compared in step S111 with a predetermined threshold value 82. When a value for this difference is equal to or smaller than δ2 ("YES" in step S111), a value for response time RT is displayed (step S112). When the user performs an operation to correct target value RT0 to RT in this display ("YES" in step S113), transition to step S110 is made and the number of pieces of data N is displayed and registered. On the other hand, when the user performs an operation to cancel without performing a correction operation ("NO" in step S113), display on display unit 121 is switched to an error indication in step S114 and thereafter the process ends.

When a difference between response time RT and target value RT0 above exceeds δ2 ("NO" in step S111) or when the number of pieces of data N calculated in step S105 is smaller than 1 ("NO" in step S106) as well, an error indication in step S114 is provided.

It is noted that more detailed display can be provided also in step S110 or step S114 in FIG. 4, as set forth in connection with step S10 or step S14 in FIG. 3.

In addition, in the examples in FIGS. 3 and 4, conditions of both of a response time and detection accuracy are specifically designated and when the number of pieces of data N derived based on a condition on which priority was placed could not satisfy the other condition on which priority was not placed, criteria for the condition on which priority was not placed are lowered to allow registration of the number of pieces of data N, however, the example is not limited as such. When neither of the conditions can be satisfied, an error indication may always be provided.

On the other hand, instead of setting the number of pieces of data N to an optimal value for the condition on which priority was placed as in the examples in FIGS. 3 and 4, the number of pieces of data N may be corrected such that a condition represented by a parameter on which priority was not placed is satisfied. In that case, however, an amount of correction is desirably limited within a certain numerical range.

In addition, together with the corrected number of pieces of data, a value for a response time or detection accuracy realized by the number of pieces of data is desirably displayed.

The processing procedure in FIGS. 3 and 4 assumes a case where the number of types of workpieces to be detected is one, however, depending on a site, there is also a case where a plurality of types of workpieces are to be processed by a single displacement sensor. Taking into consideration this aspect, the teaching mode of displacement sensor 1 above includes also a procedure for teaching processing in a case where a plurality of types of workpieces are of interest.

In the teaching processing in which a plurality of types of workpieces are of interest, the user prepares a workpiece model for each workpiece, successively sets these workpiece models at a position where each one is irradiated with laser beam L1, and performs a start indication operation. In addition, the user finally performs an operation to indicate end of the teaching processing. Each time the start indication operation is performed, CPU 110 determines maximum exposure time ST in response to that operation and calculates the number of pieces of data N of moving average calculation in accordance with a condition represented by an input parameter. Then, in response to an operation to indicate end, one of values for the derived numbers of pieces of data N is selected and registered in memory 111.

Figure 5:
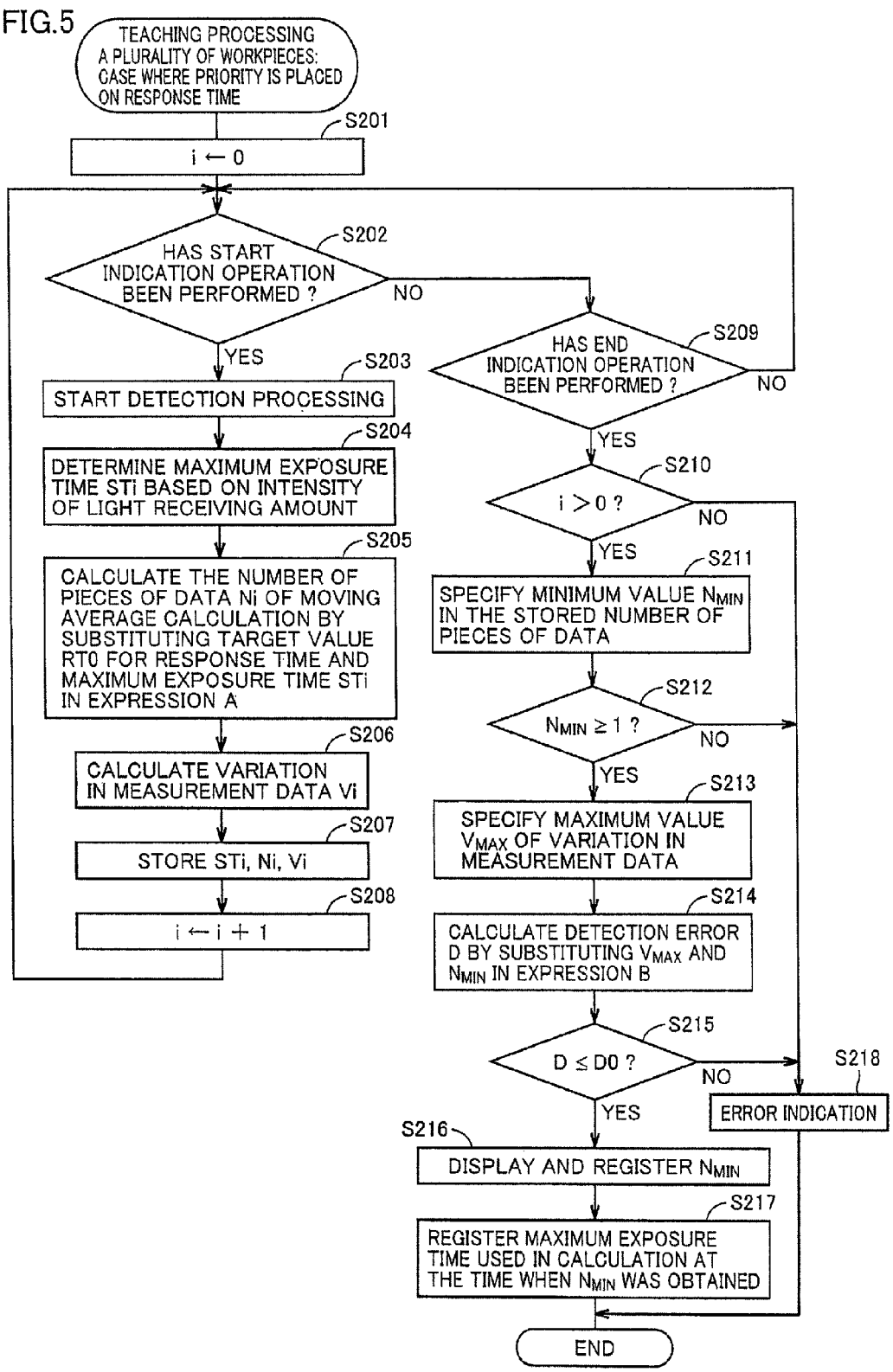
FIG. 5 is a flowchart showing a procedure of teaching processing in a case where a plurality of workpieces are of interest and priority is placed on a response time.

FIG. 5 shows an example of a processing procedure in the teaching processing in which a plurality of types of workpieces are of interest. It is noted that, in this example, it is assumed that default setting with priority being placed on a response time is applied. In addition, for simplification of description, only a procedure in a case where both of target value RT0 for a response time and tolerance value D0 for detection error are input is shown. Moreover, in this example, when the derived number of pieces of data does not satisfy a condition represented by these input values, an error indication (step S217) is always given.

Description will be given hereinafter with reference to FIG. 5.

In this processing, a counter i indicating the number of workpiece models is set to an initial value 0 in a first step S201, and the start indication operation is awaited. When the start indication operation is performed ("YES" in step S202), detection processing is started (step S203), and each time detection processing is performed, a maximum exposure time STi is determined while the exposure time is adjusted based on intensity of the light receiving amount (step S204).

Then, in step S205, target value RT0 for a response time and maximum exposure time STi determined in step S204 are substituted into Expression A to thereby calculate the number of pieces of data Ni in moving average calculation. In successive step S206, detection processing and measurement processing are performed sufficient times, to thereby calculate variation in measurement data Vi obtained in measurement processing. It is noted that this variation Vi can also be found in parallel to processing in step S204.

Thereafter, maximum exposure time STi and the number of pieces of data Ni found in the processing above as well as variation in measurement data Vi are stored in memory 111 (step S207). Then, counter i is incremented (step S208).

When an end indication operation is performed after a loop of steps S202 to 208 above is performed at least once, determination as "YES" is made in each of step S209 and step S210 and the process proceeds to step S211. In step S211, a minimum value $N_{MIN}$ in the number(s) of pieces of data stored while the loop of steps S202 to 208 is repeated is specified.

When minimum value $N_{MIN}$ above is equal to or greater than 1 ("YES" in step S212), a maximum value $V_{MAX}$ in variation in measurement data calculated in step S206 is specified (step S213). Then, this $V_{MAX}$ and minimum value $N_{MIN}$ of the number(s) of pieces of data specified in step S211 are substituted into Expression B to thereby calculate detection error D (step S214), and the calculated value is compared with tolerance value D0 (step S215).

When detection error D is equal to or smaller than tolerance value D0 ("YES" in step S215), minimum value $N_{MIN}$ above is displayed as the number of pieces of data to be registered and the number of pieces of data is registered in the memory (step S216). Then, the maximum exposure time used for calculation at the time when the number of pieces of data $N_{MIN}$ was derived is registered in memory 111 (step S217) and the process ends.

When detection error D exceeds tolerance value D0 ("NO" in step S215), an error indication (step S218) is given regardless of conditions, however, without being limited as such, processing the same as in steps S11 to S13 in FIG. 3 may be performed.

When the end indication operation is performed without the start indication operation being performed, i=0 is satisfied. Therefore, determination as "NO" is made in step S210 and the process proceeds to step S218, in which display unit 122 is switched to error indication. When the start indication operation was performed only once, the process proceeds to step S211, however, the processing hereafter in this case will substantially be similar to processing performed in each step of S5 and subsequent steps in FIG. 3.

As described above, in the processing procedure in FIG. 5, after maximum exposure time STi and the number of pieces of data Ni in moving average calculation are found for each workpiece, minimum value $N_{MIN}$ in every number of pieces of data Ni is registered and then the maximum exposure time used in calculation at the time when this minimum value $N_{MIN}$ was obtained is registered. This is because, in a case where response time RT being not greater than target value RT0 is defined as a condition, such an operation as being able to satisfy the condition above should be defined, with a workpiece longest in time required for detection processing among the plurality of types of workpieces (a workpiece lowest in reflectance) serving as the reference.

When the teaching processing above ends and the mode returns to the normal operation mode, in subsequent detection processing, every exposure time is adjusted within a range up to the registered maximum exposure time and the registered number of pieces of data is used for performing moving average calculation. As a result of this control, even in a case where any of the plurality of types of workpieces is to be detected, an exposure time can be adjusted in accordance with a reflectance of that workpiece, and response time RT can be not greater than target value R0 based on the exposure time and the registered number of pieces of data.

In addition, according to the number of pieces of data registered in the processing shown in FIG. 5, whichever of the plurality of types of workpieces may be processed, detection error D can be suppressed to tolerance value D0 or smaller as input by the user.

Though teaching processing in a case where priority is placed on a condition related to detection accuracy rather than a condition related to a response time is not shown, in this case as well, a procedure from a point of view the same as in FIG. 5 above is performed.

Briefly speaking, as in FIG. 5, each time the start indication operation is performed, detection processing is performed to determine maximum exposure time STi, and variation in measurement data Vi is calculated. Then, Expression B into which variation Vi and tolerance value D0 for detection error are substituted is used to find the number of pieces of data Ni in moving average calculation necessary for detection error D to be equal to or smaller than tolerance value D0.

When processing for all workpiece models ends, a maximum value $N_{MAX}$ in the number of pieces of data Ni found for each workpiece model is selected such that detection error D can be not greater than tolerance value D0 for any workpiece. In addition, a maximum value $ST_{MAX}$ in the maximum exposure time found for each workpiece model is specified, and response time RT is calculated by substituting $N_{MAX}$ and $ST_{MAX}$ into Expression A. Then, when this response time RT is equal to or smaller than target value RT0, the number of pieces of data $N_{MAX}$ is registered in memory 111.

As described above, in a case where a plurality of types of workpieces different in reflectance are to be detected, whichever workpiece may be processed, the number of pieces of data corresponding to the most strict criteria is desirably selected from among the numbers of pieces of data derived for the workpieces in order to be able to ensure the condition designated by the user. The selected number of pieces of data, however, does not necessarily have to be registered as it is. For example, when priority is placed on a condition related to a response time, a minimum value in the number of pieces of data found for each workpiece may be selected and thereafter a value further smaller than the minimum value (note that a value not smaller than 1) may be registered. Alternatively, when priority is placed on tolerance value D for detection accuracy, a maximum value in the number of pieces of data found for each workpiece is selected, however, a value further greater than the maximum value may be registered.

In addition, the teaching processing in a case where a plurality of types of workpieces are to be detected is also applicable to teaching processing in a case where a workpiece including a plurality of parts different in reflectance is to be detected.

In the processing described above, the optimal number of pieces of data of moving average calculation is found and registered in response to the fact that the end indication operation has been performed, however, the processing is not limited thereto. Each time the start indication operation is performed in the teaching mode, the number of pieces of data derived in response to that operation and the number of pieces of data that has been registered by that time point may be used to determine the optimal number of pieces of data, with which the registered data may be overwritten. For example, if the setting is such that priority is placed on a response time, the registered data can be overwritten with the newly derived number of pieces of data when the number of pieces of data derived in response to the new start indication operation is smaller than the registered number of pieces of data. Alternatively, if the setting is such that priority is placed on detection accuracy, the registered data can be overwritten with the newly derived number of pieces of data when the newly derived number of pieces of data is greater than the registered number of pieces of data. Alternatively, processing for deriving the number of pieces of data of moving average calculation may be performed a plurality of times during a period until the end indication operation is performed with the start indication operation being limited to once that is first performed, an optimal value may be selected from the numbers of pieces of data obtained in the plurality of times of processing in response to the fact that the end indication operation has been performed, and that value may be registered.

As described so far, in the teaching mode of displacement sensor 1 in this embodiment, such a premise is made that the user inputs at least one of target value RT0 for a response time and tolerance value D0 for detection error and installs a workpiece model at a position where it is irradiated with laser beam L1 and then the start indication operation is performed. These inputs and start indication operation can be performed through the operation unit and also through an external device such as a personal computer. In addition, audio guidance may be provided for these operations.

In a case where workpieces continuously carried on a belt conveyor or the like are to be detected by displacement sensor 1, there is a demand also for performing teaching processing while workpiece models are being carried, similarly to during use. In this case, the start indication operation should only be performed at the timing when a workpiece model is irradiated with laser beam L1 while workpiece models are being carried, however, with other methods, a signal indicating start of processing may automatically be input or a time to start processing of a workpiece model may be recognized by CPU 110 in displacement sensor 1.

For example, such detection means as a photoelectric switch or a proximity switch can be provided at a position upstream of displacement sensor 1 in a path for carrying workpieces so that a signal from the detection means can be input instead of the start indication operation. Meanwhile, in a case where a plurality of types of workpieces are to be detected, an RFID tag storing a type or the like of a workpiece may be attached to each workpiece and an RFID reader-writer may be provided as detection means.

Alternatively, CPU 110 in displacement sensor 1 may repeat detection processing and processing for finding deviation of a light receiving amount obtained in every detection processing from an immediately preceding light receiving amount, and may determine the time when the deviation exceeds a threshold value set in advance as the time to start processing on a workpiece model. Alternatively, in a case where a distance from sensor head 10 to a workpiece support surface is registered as a reference distance, detection processing and measurement processing may be repeated and the time when measurement data becomes smaller than the reference distance by a significant difference may be set as the time to start processing.

In a case where little reflected light is incident on light receiving unit 102 when a surface of the belt conveyor is irradiated with laser beam L1 from displacement sensor 1, based on transition from a state where a certain light receiving amount is obtained to a value for the light receiving amount close to zero, such determination that the time to end processing on a workpiece model has come may be made. In a case where reflected light from the belt conveyor is incident on light receiving unit 102, with a distance from sensor head 10 to the surface of the conveyor being registered as the reference distance, such determination that the time to end processing on a workpiece model has come may be made based on the fact that measurement data has recovered the reference distance.

In a case where teaching processing is performed while a belt conveyor or the like successively carries a plurality of types of workpiece models, detection processing and measurement processing are repeated as workpiece models are carried, and data to be used for teaching processing (measurement data corresponding to each workpiece model) may be selected from a history of measurement data obtained in such processing. For example, a graph showing variation in measurement data may be displayed on a display unit of such an external device as a computer and the user may individually designate a range corresponding to each workpiece model in the graph with the use of such an input device as a mouse, so that, for each workpiece model, measurement data corresponding to that model can be obtained.

In a case where a workpiece having a plurality of parts different in reflectance is to be detected, an edge on a downstream side in a path for carrying the workpiece and a boundary position between the parts may be marked with a thin film made of a material higher in reflectance than each part (for example, aluminum), and each time a peak corresponding to the reflectance of the thin film appears in the light receiving amount in light receiving unit 102, determination that a part to be detected has changed may be made and the number of pieces of data of moving average calculation may be found.

Alternatively, an imaging element for a color image is introduced in light receiving unit 102 and a color of a workpiece to be detected is registered in advance. Then, while detection processing is repeated, based on the fact that a region having a registered color is included in an image among images input from light receiving unit 102, determination that the time to start processing on a workpiece model has come may be made. In a case where an imaging element for a color image is introduced in light receiving unit 102, instead of marking with a thin film described previously, marking with a particular color may be set and that color may be detected.

Further, with regard to target value RT0 for a response time, not only a user's direct input of a numerical value but also input of a moving speed of a workpiece or a length along a direction in which the workpiece is carried may be accepted and target value RT0 may be calculated from these values. Similarly, in a case where a displacement sensor is installed for the purpose of detecting an amount of displacement of an outer circumferential surface of a disc-shaped or cylindrical substance while the substance is turning, input of a rotation speed or a diameter of the substance may be accepted and target value RT0 for a response time may be found out from these values. It is noted that this type of calculation is not limited to calculation performed by using a sensor but may be performed by an external device.

After the number of pieces of data of moving average calculation is registered, test measurement of a workpiece model may be conducted based on that registration, and an actual response time or detection data may be displayed such that whether a condition designated by the user is satisfied or not can be checked. In addition, in this case, the registered number of pieces of data of moving average calculation may be corrected in response to an operation to designate change in displayed response time or accuracy in detection data.

Displacement sensor 1 configured as above can also have a function to output the number of pieces of data N of moving average calculation derived in teaching processing to an external device or a function to receive input of the number of pieces of data N from an external device and to register the same in memory 111 to the contrary. By doing so, in a case where a common workpiece is to be detected by a plurality of displacement sensors 1, such as a case where displacement sensors 1 are arranged at a plurality of locations on a single belt conveyor, the number of pieces of data N derived by any one sensor 1 can be transferred to another sensor 1 through an external device. According to this method, by subjecting only one of the plurality of displacement sensors 1 to teaching processing, the number of pieces of data N derived in that teaching processing can be registered in all displacement sensors 1, so that the user's efforts in connection with teaching processing can significantly be lessened.

It is noted that, by allowing communication between sensors, the number of pieces of data N above can also directly be passed between the sensors without through an external device.

In the teaching processing described so far, the user designates at least one of target value RT0 for a response time and tolerance value D0 for detection error and the number of pieces of data N of moving average calculation suitable for the designated condition is derived, however, it is also possible that, without designation of target value RT0 or tolerance value D0, a workpiece model is installed at a position where it is irradiated with laser beam L1 and detection processing, measurement processing, and the like are performed, so that a value appropriate for the number of pieces of data N of moving average calculation is automatically found out and registered.

In this case as well, a workpiece model is installed at a position where it is irradiated with laser beam L1, and detection processing and measurement processing are started in response to a start indication operation or an external signal input. In addition, maximum exposure time ST is determined and variation in measurement data V is calculated while processing for adjusting an exposure time is performed based on intensity of every light receiving amount.

Figure 6:
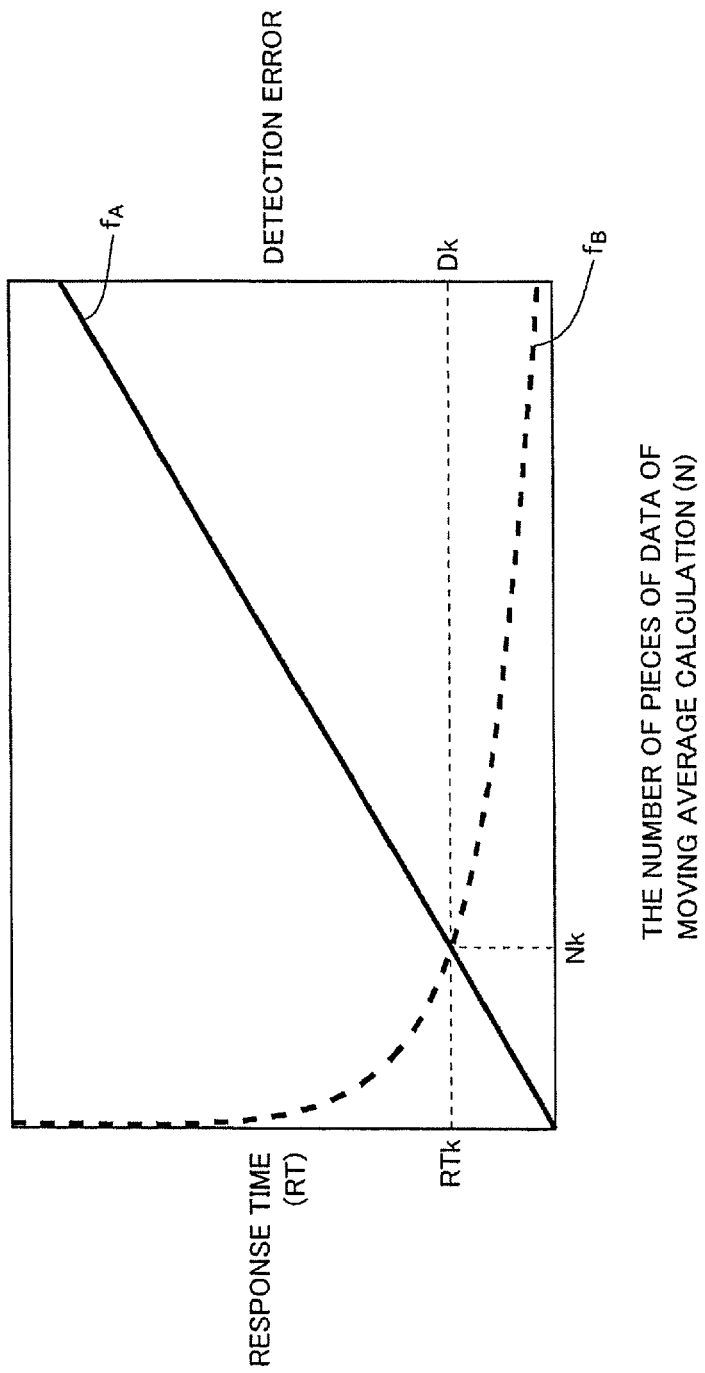
FIG. 6 is a graph exemplifying a function showing relation between a response time and the number of pieces of data of moving average calculation and a function showing relation between a detection error and the number of pieces of data of moving average calculation.

Here, maximum exposure time ST and variation in measurement data V are applied to Expression A and Expression B, respectively. Then, as shown in FIG. 6, a function $f_A$ representing relation between the number of pieces of data N of moving average calculation and response time RT and a function $f_B$ representing relation between the number of pieces of data N of moving average calculation and detection error D can be specified. Therefore, for example, values $N_K$, $RT_K$, $D_K$ corresponding to a coordinate at an intersection of a graph of function $f_A$ and a graph of function $f_B$ for N, RT, D are found, $N_K$ is displayed as the number of pieces of data to be registered, and $RT_K$ and $D_K$ are displayed as a response time and detection accuracy respectively in a case where moving average calculation using the number of pieces of data $N_K$ is performed. When the user confirms such display contents and performs a registration operation, a value for $N_K$ is registered in memory 111.

Alternatively, three numerical values of $N_K$ above, a value ($N_K$–E) calculated by subtracting a prescribed number E from $N_K$, and a value ($N_K$+E) obtained by adding E to $N_K$ are set as registration candidates, $N_K$ is defined as such a setting value that a response time and detection accuracy are in good balance, $N_K$–E is defined as a setting value in a case where priority is placed on a response time, $N_K$+E is defined as a setting value in a case where priority is placed on detection accuracy, and then they are each combined with corresponding response time and detection accuracy. Such combinations may be displayed to have the user select any combination.

In addition, the number of pieces of data does not necessarily have to be displayed, and combinations of a response time and detection accuracy corresponding to each number of pieces of data may be displayed and a selection operation may be accepted. Alternatively, an operation to designate a value higher or lower than a response time or detection accuracy displayed here may be accepted to change display of a response time and detection accuracy, and when resultant display is selected, the number of pieces of data corresponding to that display may be registered.

Finally, operation processing based on a processing time period for detection processing (a maximum exposure time) or on variation in measurement data is performed to derive the number of pieces of data of moving average calculation in connection with a displacement sensor of a type measuring an amount of displacement based on principles of triangulation has been described so far, however, a displacement sensor for measuring an amount of displacement with other methods being capable of finding the number of pieces of data of moving average calculation by executing a similar teaching mode will also be described.

For example, in a displacement sensor of a TOF type, a processing time period for detection processing should be adjusted depending on a length of a distance that may be detected. Therefore, for example, by adjusting a processing time period for detection processing in such a state that a lowest part of a workpiece model is detected, the processing time period should be determined and variation in measurement data should be found. Thereafter, the number of pieces of data N of moving average calculation can be found with a method similar to that in each embodiment above, and the number of pieces of data can be registered together with the adjusted processing time period.

In a displacement sensor of a phase difference rangefinding type or of a PC code rangefinding type, in order to make an amplitude of a wave included in a signal indicating a light receiving amount of reflected light sufficiently great, an exposure time should be adjusted as in a displacement sensor of a triangulation type. In addition, as an exposure time is longer, the number of waves included in a signal indicating a light receiving amount of reflected light increases, so that more stable measurement processing can be achieved. Therefore, in teaching processing of a displacement sensor of this type, desirably, after an exposure time becomes stable as a result of adjustment processing, detection processing and measurement processing are performed prescribed times and variation in measurement data during that period is found. In this case as well, a maximum exposure time is determined while an exposure time is adjusted, and this maximum exposure time and variation in measurement data can be used to find the number of pieces of data N of moving average calculation and to register the same.

Reference Signs List

W workpiece; 1 displacement sensor; 101 light projecting unit; 102 light receiving unit; 103 light emitting element; 104 light projection control circuit; 105 imaging element; 106 signal processing circuit; 107 A/D conversion circuit; 110 CPU; 111 memory; 121 display unit; 122 operation unit; and 123 input/output interface.

What is claimed is:

1. A displacement sensor for repeatedly performing a detection process including projecting light onto an object and receiving light reflected from the object and a measurement process that measures an amount of displacement of the object based on the reception of the reflected light, and determines a moving average calculation of data of the measured amount, for outputting detection data based on an average value obtained by the moving average calculation, comprising:
　a register that registers a number of pieces of data of the moving average calculation;
　an input that inputs a parameter representing conditions related to a response time of the displacement sensor and a parameter representing conditions related to accuracy of the detection data; and
　a teaching mode processor that executes a teaching mode in which the number of pieces of data of the moving average calculation is registered with the register, wherein
　the teaching mode processor includes:
　　a setting processor that executes the detection process and the measurement process, each for a plurality of times, and executes a process for setting a processing time of the detection process and a process of calculating a variation of measurement data obtained by the measurement process,
　　a data number deriving processor that derives, on a condition that at least one of the parameter representing conditions related to response time and the parameter representing conditions related to accuracy of the detection data is input to the input and the processes are executed by the setting processor, the number of pieces of data of moving average calculation suitable for the value of the input parameter, by an operation using results of processing by the setting processor, and
　　a registration processor that determines the number of pieces of data of the moving average calculation based on the result of processing by the data number deriving processor and registers the number with the register.

2. The displacement sensor according to claim 1, wherein the input inputs a numerical value representing a target value of the response time as the parameter representing conditions related to response time, and inputs a numerical value representing an error tolerance value of detection data as the parameter related to accuracy of the detection data, and
　the data number deriving processor executes an operation using at least one of a first operational expression representing a relationship between the processing time of the detection process, the number of pieces of data of the moving average calculation and the response time, and a second operational expression representing a relationship between the variation of measurement data, the number of pieces of data of the moving average calculation and the error of detection data.

3. The displacement sensor according to claim 2, wherein when both of the parameters representing the target value of the response time and the error tolerance value of detection data are input to the input, the data number deriving processor selects either one of the parameters according to priority, executes a first operation of calculating the number of pieces of data of moving average calculation by applying the value input for the parameter and the result of processing by the setting processor to the operational expression corresponding to the selected parameter, and thereafter executes a second operation by applying the number of pieces of data of moving average calculated by the first operation and the result of processing by the setting processor to the operational expression corresponding to the unselected parameter, to calculate the value of the parameter, and the registration processor determines whether or not the value of the unselected parameter calculated by the second operation matches the value input to the input, and when it is determined to be a match, registers the number of pieces of data of moving average calculated by the first operation with the register.

4. The displacement sensor according to claim 3, further comprising an output that outputs, when it is determined by the registration processor that the value of the unselected parameter calculated by the second operation does not match the value input to the input, the value of the parameter calculated by the second operation for display.

5. The displacement sensor according to claim 1, further comprising a signal input that inputs a signal instructing a start of processing in the teaching mode, wherein the setting processor operates in response to an input of the signal.

6. The displacement sensor according to claim 5, wherein the data number deriving processor and the registration processor operate together with the setting processor, when the signal instructing the start of processing is input, and in response to the input of the signal beginning with a second time, the registration processor determines an optimal value of the number of pieces of data of moving average, using the number of pieces of data derived from processing by the setting processor and the data number deriving processor in response to the input, and the number of pieces of data registered with the register in response to the previously input signal.

7. The displacement sensor according to claim 5, further comprising a second signal input that inputs a signal instructing an end of processing in the teaching mode, wherein the setting processor and the data number deriving processor operate when the signal instructing the start of processing is input, and the registration processor operates in response to an input of the signal instructing the end of processing, and when the signal instructing the start of processing is input a plurality of times before the signal instructing the end of processing is input, the registration processor determines an optimal value of the number of pieces of data of moving average, using the number of pieces of data of each moving average derived by the data number deriving processor in response to every input of the signal.

8. The displacement sensor according to claim 5, further comprising a second signal input that inputs a signal instructing an end of processing in the teaching mode, wherein the setting processor and the data number deriving processor operate in response to an input of the signal instructing the start of processing, and the registration processor operates in response to an input of the signal instructing the end of processing, the setting processor and the data number deriving processor are capable of executing processes a plurality of times from the input of the signal instructing the start of processing until the input of the signal instructing the end of processing, and when a plurality of numbers of data of moving average are derived by the data number deriving processor before the signal instructing the end of processing is input, the registration processor determines an optimal value of the number of pieces of data of moving average, using the plurality of numbers of data.

9. The displacement sensor according to claim 7, further comprising a signal generator that generates the signal instructing the start of processing and the signal instructing the end of processing.

10. The displacement sensor according to claim 8, further comprising a signal generator that generates the signal instructing start of processing and the signal instructing end of processing.

11. A displacement sensor for repeatedly performing a detection process including projecting light onto an object and receiving light reflected from the object and a measurement process that measures an amount of displacement of the object based on the reception of the reflected light, and determines a moving average calculation of data of the measured amount, for outputting detection data based on an average value obtained by the moving average calculation, comprising:

a register that registers a number of pieces of data of the moving average calculation; and a teaching mode processor that executes a teaching mode in which the number of pieces of data of the moving average calculation is registered with the register, wherein the teaching mode processor includes:

a setting processor that executes the detection process and the measurement process, each for a plurality of times, and executes a process for setting a processing time of the detection process and a process of calculating a variation of measurement data obtained by the measurement process, a specifying processor that specifies a first function representing a relationship between a response time of the displacement sensor and the number of pieces of data of moving average calculation, based on a processing time of the detection process set by the setting processor, specifying a second function representing a relationship between an error of detection data and the number of pieces of data of the moving average calculation based on the variation of measurement data calculated by the setting processor, and for specifying, based on the first and second functions, at least one combination of the number of pieces of data of moving average, the response time corresponding to the number of pieces of data, and the error of detection data corresponding to the number of pieces of data, and a registration processor that displays the combination of response time and accuracy of detection data specified by the specifying means to be ready for a selection operation and, when any displayed combination is selected, that registers the number of pieces of data of moving average corresponding to the selected combination with the register.

* * * * *